US009158113B2

(12) United States Patent
Amirparviz et al.

(10) Patent No.: US 9,158,113 B2
(45) Date of Patent: Oct. 13, 2015

(54) INTEGRATED DISPLAY AND PHOTOSENSOR

(75) Inventors: Babak Amirparviz, Mountain View, CA (US); Chia-Jean Wang, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 465 days.

(21) Appl. No.: 13/420,316

(22) Filed: Mar. 14, 2012

(65) Prior Publication Data

US 2013/0241907 A1 Sep. 19, 2013

(51) Int. Cl.
| | |
|---|---|
| *G09G 5/00* | (2006.01) |
| *G02B 27/00* | (2006.01) |
| *G06F 3/01* | (2006.01) |
| *G09G 3/00* | (2006.01) |
| *G02B 27/01* | (2006.01) |
| *G09G 3/34* | (2006.01) |

(52) U.S. Cl.
CPC ........ *G02B 27/0093* (2013.01); *G02B 27/0172* (2013.01); *G06F 3/013* (2013.01); *G09G 3/001* (2013.01); *G09G 3/346* (2013.01); *G02B 2027/0138* (2013.01); *G02B 2027/0178* (2013.01); *G02B 2027/0187* (2013.01); *G09G 3/3413* (2013.01); *G09G 2354/00* (2013.01); *G09G 2360/14* (2013.01); *G09G 2370/027* (2013.01)

(58) Field of Classification Search
CPC ........ G02B 6/00; G02B 26/00; G02B 27/017; G02B 27/0093; G02B 2027/0178; G02B 2027/0187; G06F 3/013; G09G 2360/14; G09G 2360/142; G09G 3/3413; G09G 3/001; G09G 3/346; G09G 2370/027
See application file for complete search history.

(56) References Cited

U.S. PATENT DOCUMENTS

| | | | |
|---|---|---|---|
| 4,711,512 A | 12/1987 | Upatnieks | |
| 5,076,664 A | 12/1991 | Migozzi | |
| 5,734,357 A * | 3/1998 | Matsumoto | 345/7 |
| 5,886,822 A | 3/1999 | Spitzer | |
| 6,028,581 A | 2/2000 | Umeya | |
| 6,529,331 B2 * | 3/2003 | Massof et al. | 359/630 |
| 7,737,394 B2 * | 6/2010 | Ovsiannikov et al. | 250/226 |
| 2004/0085292 A1 * | 5/2004 | Spitzer et al. | 345/156 |
| 2004/0140961 A1 * | 7/2004 | Cok | 345/175 |
| 2007/0290246 A1 | 12/2007 | Zhang et al. | |
| 2009/0128758 A1 * | 5/2009 | Mori et al. | 349/118 |
| 2010/0330713 A1 * | 12/2010 | Lee et al. | 438/24 |
| 2011/0213664 A1 | 9/2011 | Osterhout et al. | |
| 2012/0212499 A1 * | 8/2012 | Haddick et al. | 345/589 |

OTHER PUBLICATIONS

PCT/US2013/029047—International Search Report and Written Opinion, mailed Jun. 27, 2013 (12 pages).
Vogel, U., "Interactive See-Through Augmented-Reality Displays (iSTAR)," Fraunhofer-Gesellschaft, Fraunhofer Institute for Photonic Microsystems (IPMS), Oct. 28, 2009 (16 pages).
PCT/US2013/029047—PCT International Preliminary Report on Patentability, mailed Sep. 25, 2014 (8 pages).

* cited by examiner

*Primary Examiner* — Linh N Hoffner
(74) *Attorney, Agent, or Firm* — Blakely Sokoloff Taylor & Zafman LLP (57) ABSTRACT

An apparatus for simultaneously imaging a subject and displaying computer generated image ("CGI") light to the subject includes a display array and a photodetector array. The display array and the photodetector array are disposed on a same semiconductor die. The display array includes display pixels configured to selectively generate the CGI light to be sent along a forward optical path. The photodetector array is positioned to receive non-visible image light that is reflected by the subject and directed along a reverse optical path. The CGI light to be sent along the forward optical path travels in a substantially opposite direction as the non-visible image light directed along the reverse optical path.

24 Claims, 8 Drawing Sheets

INTEGRATED DISPLAY AND PHOTOSENSOR

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD can serve as the hardware platform for realizing augmented reality. With augmented reality, the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an integrated display and photosensor apparatus and embodiments of methods of operation for a head mounted display ("HMD") are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
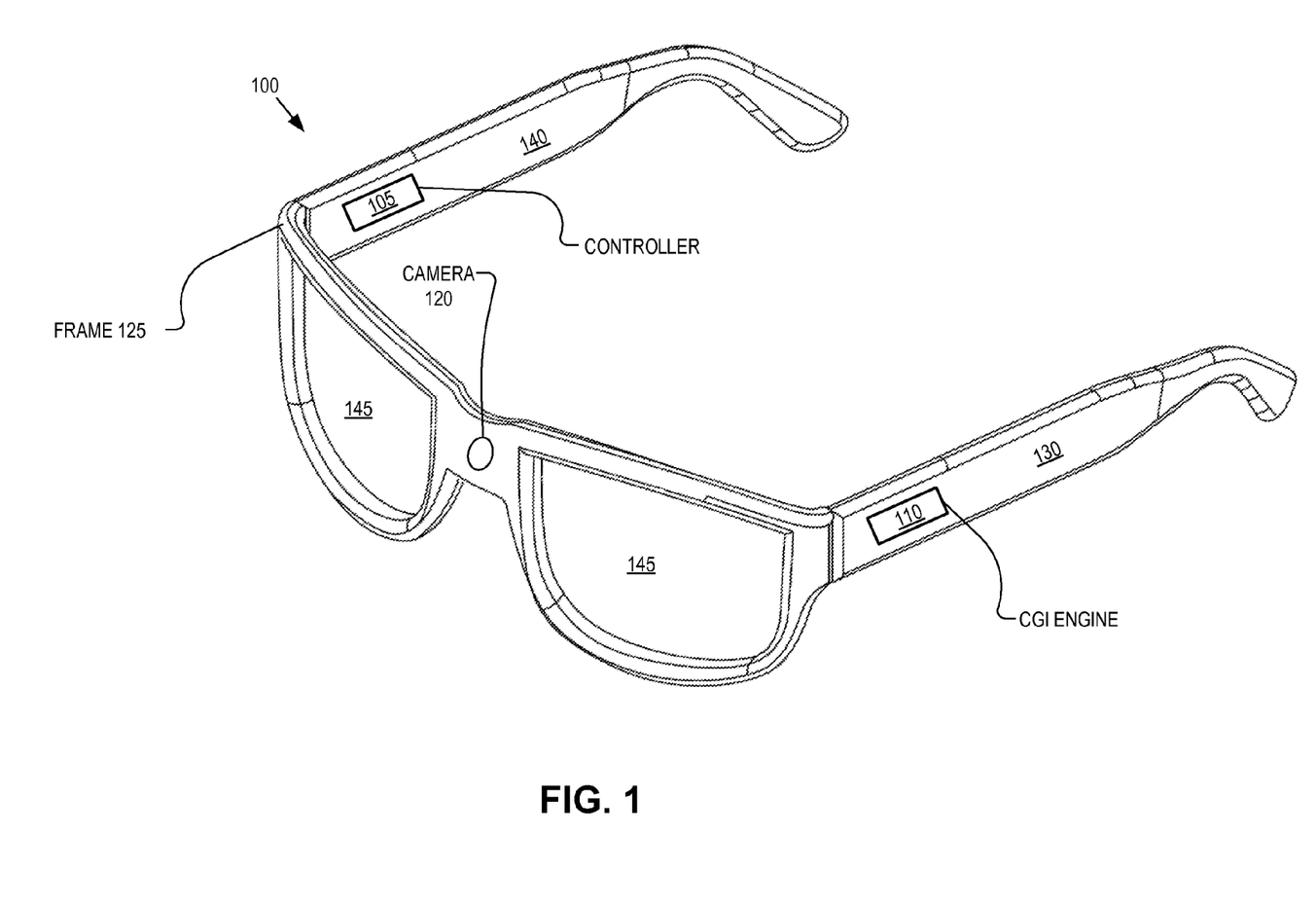
FIG. 1 is a perspective view of wearable glasses for human-computer interaction, in accordance with an embodiment of the disclosure.

FIG. 1 is a perspective view of wearable glasses for human-computer interaction, in accordance with an embodiment of the disclosure. The illustrated embodiment of wearable glasses 100 includes lenses 145 disposed in frame 125 that includes left temple arm 130 and right temple arm 140. Although FIG. 1 illustrates a traditional eyeglass frame 125, embodiments of the present invention are applicable to a wide variety of frame types and styles (e.g. visor, headband, goggles). Lenses 145 may or may not be corrective lenses with optical power and in some embodiments, may even be omitted.

Wearable glasses 100 may include a controller 105 disposed in right temple arm 140 and a computer generated image ("CGI") engine 110 disposed in left temple arm 130. Controller 105 and CGI engine 110 may be disposed in other locations in wearable glasses 100. Controller 105 may include an integrated circuit with hardware, firmware, or software logic. CGI engine 110 may include a processor and graphics engine for rendering image data. In one embodiment, controller 105 and CGI engine 110 are combined in one integrated-chip. Controller 105 may be used to receive, transmit, and process data and communicate with CGI engine 110. CGI engine 110 may generate images for displaying to the eye of a user. The illustrated embodiment of wearable glasses 100 includes a camera 120 disposed in a bridge of frame 125. Camera 120 may be forward facing (as illustrated) or located in different locations in frame 125 and more than one camera may be utilized in some embodiments.

Figure 2A:
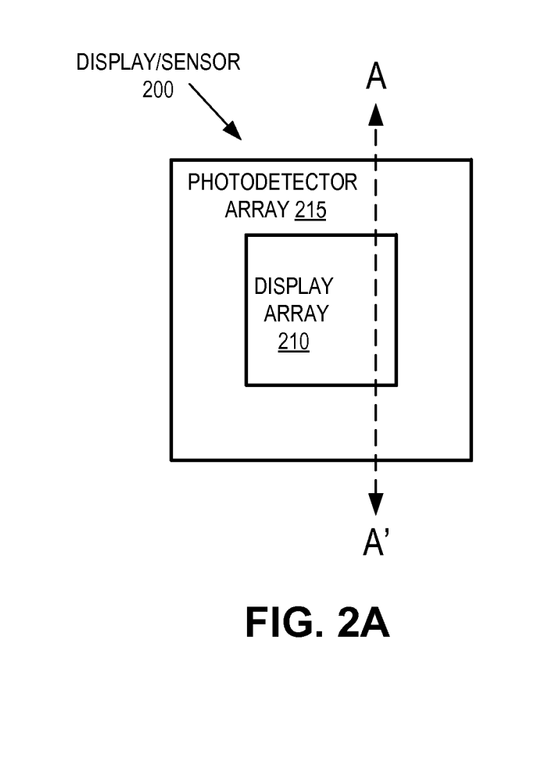
FIG. 2A is a front view of an example integrated display and sensor, in accordance with an embodiment of the disclosure.

FIG. 2A is a front view of display/sensor 200, in accordance with an embodiment of the disclosure. Display/sensor 200 may simultaneously image a subject and display CGI light to the subject. Display/sensor 200 includes a display array 210 and a photodetector array 215. In one embodiment, the subject is a human eye and photodetector array 215 monitors the gaze of the eye and display array 210 displays CGI light to the eye, based on the gaze of the eye.

Display array 210 may include different technologies such as Liquid Crystal on Silicon ("LCOS"), organic light emitting diodes ("OLED"), quantum dots, backlit liquid crystal display ("LCD"), micro mirror projecting technology, or otherwise. Photodetector array 215 may use CMOS photodiodes (e.g. P-N photodiode), but other technologies may be used. In one embodiment, display array 210 and photodetector array 215 are disposed in the same chip package. In one embodiment, display array 210 and photodetector array 215 are disposed on the same semiconductor die or silicon substrate. In the illustrated embodiment, photodetector array 215 surrounds display array 210. In other embodiments, photodetector array 215 may partially encircle display array 210, or simply be disposed adjacent to sides of display array 210.

Figure 2B:
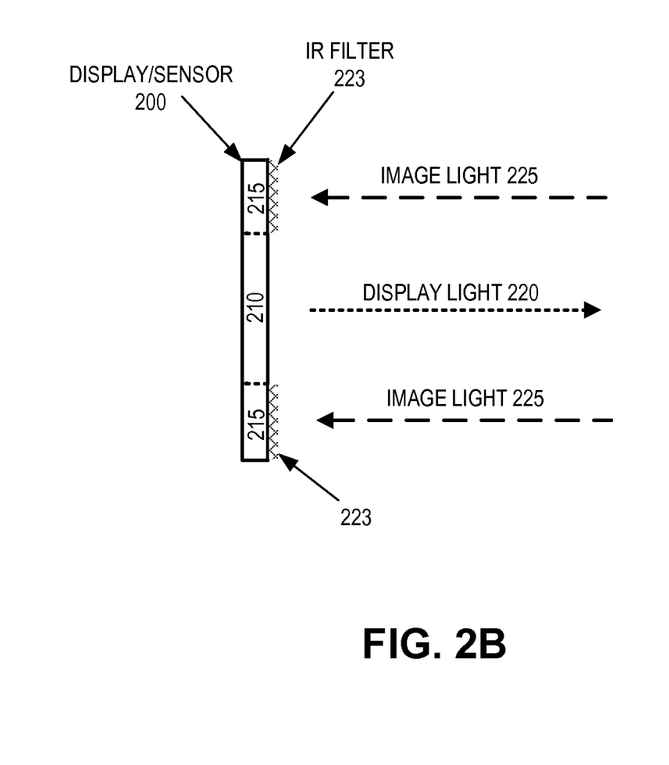
FIG. 2B is a cross-sectional side view through line A-A' of the example integrated display and sensor illustrated in FIG. 2A, in accordance with an embodiment of the disclosure.

FIG. 2B is a cross-sectional side view (through line A-A' of FIG. 2A) of display/sensor 200, in accordance with an embodiment of the disclosure. Display array 210 includes display pixels configured to selectively generate CGI light (such as display light 220) to be sent along a forward optical path. Photodetector array 215 includes photodetector pixels that are positioned to receive light (such as image light 225) that is reflected by the subject and directed along a reverse optical path. The light traveling along the reverse optical path may travel in an opposite or substantially opposite direction as display light 220 directed along the forward optical path. In one embodiment, the light that the subject reflects (e.g. image light 225) is non-visible light. The non-visible light may be between 800 and 1000 nm. In one embodiment, IR filter 223 is disposed over photodetector array 215 so that image light 225 must travel through IR filter 223 before reaching photodetector array 215. IR filter 223 may substantially filter out visible light and substantially pass the non-visible image light to photodetector array 215. In one embodiment, IR filter 223 is a bandpass filter that substantially passes near-infrared light between 800 and 1000 nm.

Figures 3A, 3B:
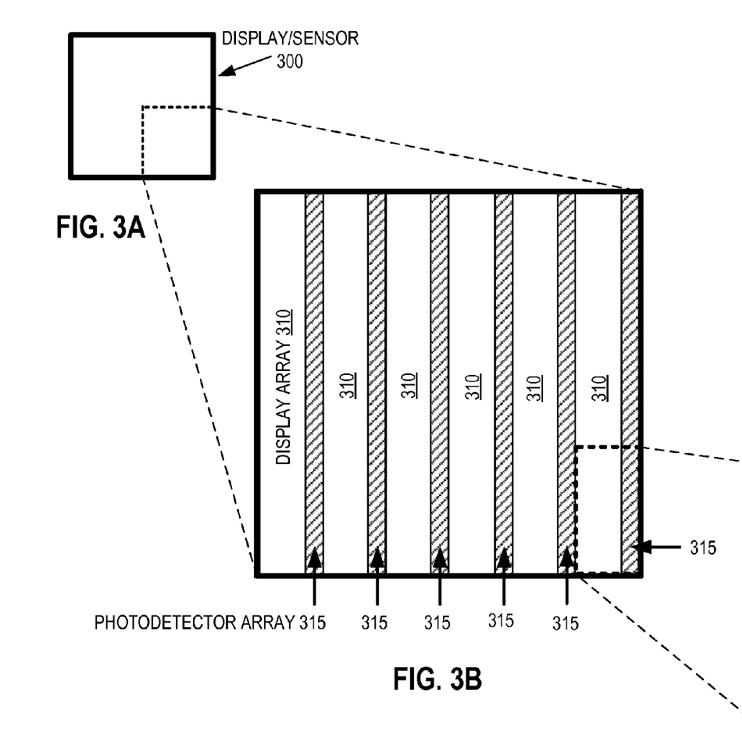
FIGS. 3A-3C are progressively zoomed-in front views of sections of an example integrated display and sensor, in accordance with an embodiment of the disclosure.
Figure 3C:
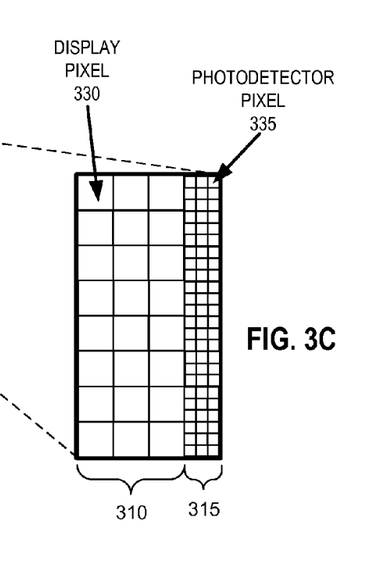

FIGS. 3A-3C are progressively zoomed-in front views of sections of display/sensor 300, in accordance with an embodiment of the disclosure. FIG. 3B shows an array level zoomed-in view of a section of display/sensor 300, illustrated in FIG. 3A. FIG. 3B illustrates that display/sensor 300 includes a display array 310 and a photodetector array 315 disposed on the same semiconductor die. FIG. 3B shows display array 310 and photodetector array 315 arranged in a repeating pattern. FIG. 3B also shows that lines of display array 310 are interlaced with lines of photodetector array 315 in a repeating pattern. The lines may be oriented as columns or as rows. Other repeating patterns are possible. One repeating pattern may include photodetector pixels of photodetector array 315 uniformly distributed amongst display pixels of display array 310. In one embodiment, photodetector pixels of photodetector array 315 are uniformly distributed amongst display pixels of display array 310 in a checkerboard-like pattern that is repeated on the semiconductor die. It is appreciated that photodetector array 315 may have a different resolution than display array 310, which may affect the relative distribution of the pixels and the pattern of the pixels.

FIG. 3C shows a pixel level zoomed-in view of a section of FIG. 3B. FIG. 3C shows that display array 310 includes display pixels 330 and that photodetector array 315 includes photodetector pixels 335. In the illustrated embodiment of FIG. 3C, the line of display array 310 is three display pixels 330 wide and the line of photodetector array 315 is three photodetector pixels wide. However the lines of display array 310 and photodetector array 315 are not limited to being three pixels wide—each of the lines may be any number of pixels wide, including one pixel wide. In one embodiment, the line of display array 310 is three display pixels 330 wide and the line of photodetector array 315 is one photodetector pixel 335 wide. The arrangement and size of the pixels may be determined by the resolutions of display array 310 and photodetector array 315.

The display technology may also affect the relative resolution of display array 310. For example, LCOS technology that requires color filters may be utilized, which may require more display pixels 330. Color sequential LCOS technology may require fewer display pixels 330. If the LCOS technology requires color filters and red, green, and blue pixels, display array 310 may have more pixels. Depending on the technology selected (LCOS or otherwise) red, green, and blue filters may be disposed over respective display pixels 330. If photodetector pixels 335 are configured to detect a specific wavelength or spectrum of light (e.g. non-visible light), filters may be disposed over photodetector pixels 335. In one embodiment, an IR bandpass filter is used that substantially passes near-infrared light between 800 and 1000 nm. In one embodiment, display pixels 330 are LCOS pixels that are approximately 5-20 µm. Photodetector pixels 335 may be CMOS photodiodes that are approximately 2-5 µm.

Figure 4A:
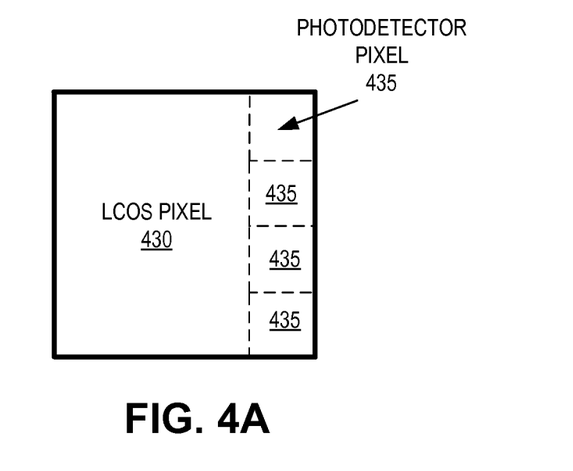
FIGS. 4A and 4B illustrate an example Liquid Crystal on Silicon pixel overlapping example photodetector pixels, in accordance with an embodiment of the disclosure.
Figure 4B:
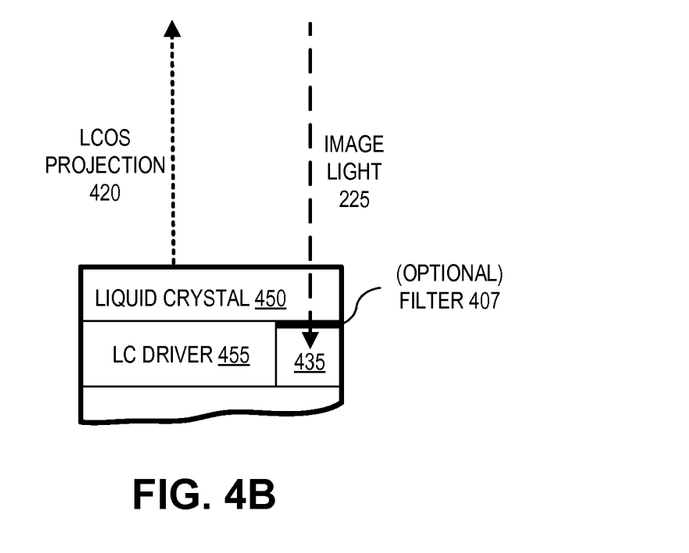

FIGS. 4A and 4B illustrate an example Liquid Crystal on Silicon pixel overlapping example photodetector pixels, in accordance with an embodiment of the disclosure. FIG. 4A is a top view of an LCOS pixel 430 overlaying photodetector pixels 435. LCOS pixel 430 and photodetector pixels 435 are disposed on the same semiconductor (e.g. silicon) substrate in the illustrated embodiment. Photodector pixels 435 are shown with dashed lines in FIG. 4A to indicate that they are underneath at least a portion of LCOS pixel 430. LCOS pixel 430 may be in a display array and photodetector pixels 435 may be in a photodetector array. Different arrangements of how many photodetector pixels 435 may be underneath a portion of LCOS pixel 430 are possible. In one embodiment, one photodetector pixel 435 may be underneath more than one LCOS pixel 430.

FIG. 4B is a cross-sectional side view of LCOS pixel 430 and photodetector pixel 435. In the illustrated embodiment, photodetector pixel 435 is disposed under liquid crystal 450 of LCOS pixel 430. Liquid Crystal ("LC") driver 455 is also disposed under liquid crystal 450 and is disposed adjacent to photodetector pixel 435. Optionally, filter 407 may be disposed above photodetector pixel 435 so that image light 225 must travel through filter 407 before reaching photodetector pixel 435. Filter 407 may substantially pass near-infrared light between 800 and 1000 nm. In the illustrated embodiment, LC driver 455 is disposed under a portion of liquid crystal 450 to manipulate liquid crystal 450 according to signals received by LC driver 455. The signals received by LC driver 455 will cause LCOS pixel 430 to selectively reflect emitted light to generate LCOS projection 420. It is appreciated that LC driver 455 may only be able to manipulate the portion of liquid crystal 450 above LC driver 455 and that the portion of liquid crystal 450 disposed above photodetector pixel 435 may remain in a substantially unchanged, steady state.

Liquid crystal 450 may influence image light 225 when image light 225 travels through photodetector pixel 435. A correction may be applied to account for the optical transmission characteristics of liquid crystal 450 that may influence image light 225. A calibration procedure may be initiated using a known light source to derive the optical transmission characteristics of liquid crystal 450. A correction factor or equation that accounts for the optical transmission characteristics of liquid crystal 450 may be applied to an image signal that photodetector pixel 435 outputs. The correction may be applied with hardware and/or with firmware/software.

With regard to FIGS. 2A-4B, it is appreciated that a light source (not shown) may emit visible illumination light to be provided to display array 210, 310, or an array of LCOS pixels 430 when the respective display arrays include a reflective display technology, such as LCOS or micro mirrors. The visible illumination light may be directed to the display arrays by mirrors. A lens or a series of lenses may be disposed between a light source and the one of the display arrays. The light source may include a red-green-blue light emitting diode ("RGB LED") contained in one chip package. Alternatively, the light source may include, separate, discrete red, green and blue LEDs. The light source may include a white LED or a series of white LEDs. The LEDs may be arranged in series strings or in parallel. In one embodiment, modulation circuitry is configured to individually strobe each color (RGB) of the LEDs.

Furthermore, a second light source (not shown) may be positioned to emit light onto the subject to provide light that can be reflected by the subject and received by photodetector array 215, 315, or an array of photodetector pixels 435. In one embodiment, the second light source emits non-visible light onto the subject. The light emitted by the second light source may encounter filters, mirrors, and/or lenses before being directed toward one of the photodetector arrays.

Figure 5:
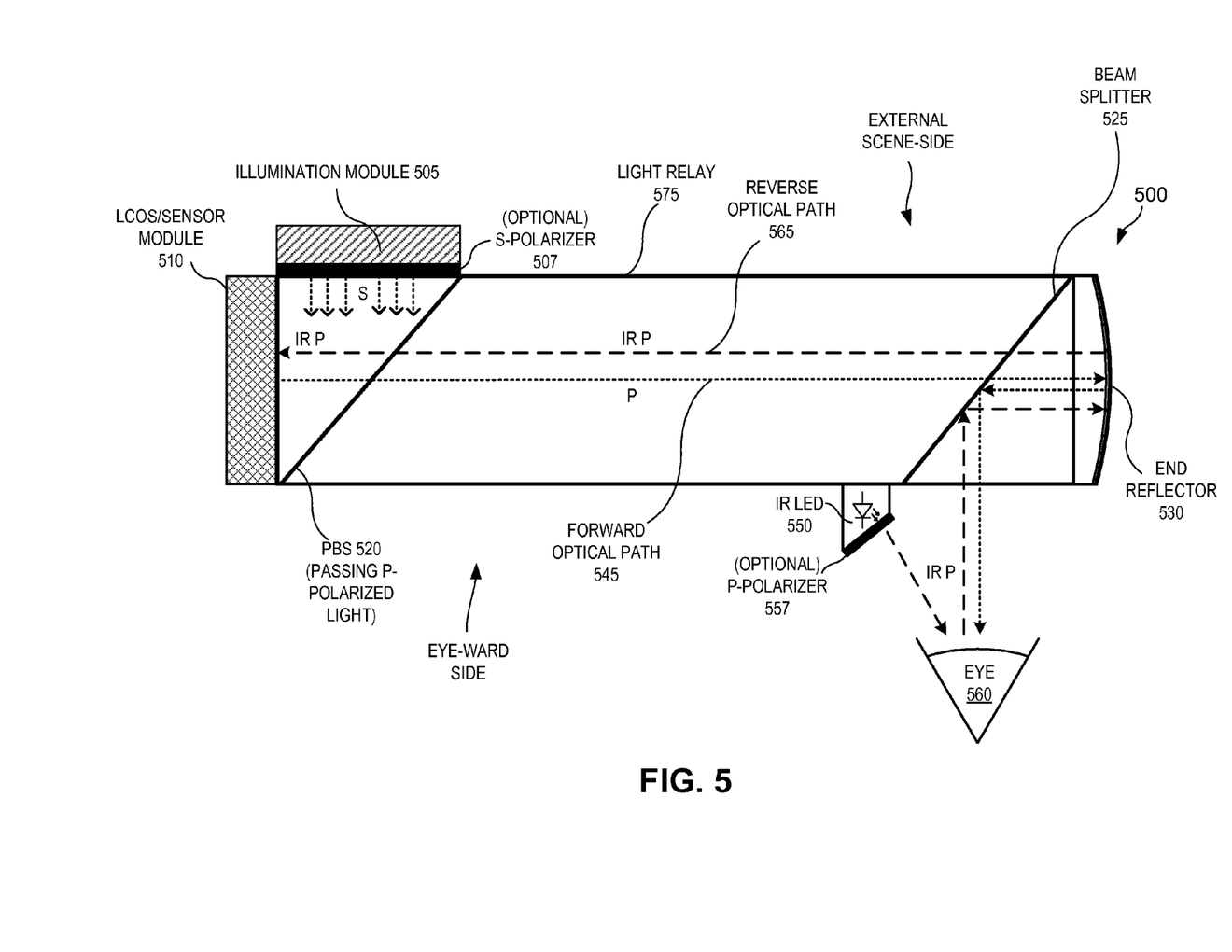
FIG. 5 is a top cross-sectional view of an eyepiece optical system, in accordance with an embodiment of the disclosure.

FIG. 5 is a top cross-sectional view of an eyepiece optical system, in accordance with an embodiment of the disclosure. Eyepiece 500 may be integrated into wearable glasses 100. The illustrated embodiment of eyepiece 500 includes an illumination module 505, optional s-polarizer 507, an LCOS/sensor module 510, and a light relay 575. Eyepiece 500 also includes a polarizing beam splitter ("PBS") 520, a beam splitter 525, an end reflector 530, and an IR LED 550 with an optional p-polarizer 557. Light relay 575 is also included in eyepiece 500.

In the illustrated embodiment, illumination module 505 is disposed on an external scene-side of eyepiece 500. Illumination module 505 includes a light source that may be implemented with a light emitting diode ("LED"), a laser, bulb, or otherwise. If the light source is LED based, the light source may include a red-green-blue light emitting diode ("RGB LED") contained in one chip package. Alternatively, the light source may include, separate, discrete red, green, and blue LEDs. The light source may include a white LED or a series of white LEDs. The LEDs may be arranged in series strings or in parallel. In one embodiment, modulation circuitry is configured to individually strobe each color (RGB) of the LEDs. Illumination module 505 may include diffuse filters or other optical schemes to more uniformly distribute the light emitted by illumination module 505.

Optionally, s-polarizer 507 may be included in illumination module 505 so that illumination module 505 emits light with a specific polarization orientation. S-polarizer 507 is an example filter that could be included in illumination module 505, but it is appreciated that s-polarizer 507 could be exchanged for a filter that emits light of a different polarization orientation (e.g. p-polarization orientation) if corresponding adjustments are made to other components in eyepiece 500. In one embodiment, illumination module 505 does not have a polarizing filter.

In the illustrated embodiment, LCOS/sensor module 510 is disposed on a side of eyepiece 500 that is approximately perpendicular to the external scene-side of eyepiece 500. LCOS/sensor module 510 includes an LCOS array and a photodetector array. The layouts of display/sensor 200 and 300 and the embodiment described above in connection with FIGS. 2A-3C may be incorporated into LCOS/sensor module 510. Additionally, embodiments of LCOS pixel 430 and photodetector pixels 435 as discussed in connection with FIGS. 4A-4B may be included in LCOS pixels in the LCOS array of LCOS/sensor module 510. The LCOS array of LCOS/sensor module 510 includes LCOS pixels configured to selectively generate CGI light to be sent along forward optical path 545 toward end reflector 530. Photodetector pixels of a photodetector array within LCOS/sensor module 510 are positioned to receive infrared or near-infrared light that is reflected by eye 560 and directed along reverse optical path 565.

Light relay 575 has a transparent structure to permit the CGI light along forward optical path 545 to pass through light relay 575. Light relay 575 may be fabricated of a solid transparent material (e.g., glass, quartz, acrylic, clear plastic, PMMA, ZEONEX—E48R, etc.) or be implemented as a solid housing having an inner air gap through which the CGI light passes. Light relay 575 operates to protect the optical paths, but may not use total internal reflection ("TIR") to guide or confine the CGI light. In one embodiment (not shown), light relay 575 is curved.

PBS 520 is positioned to direct the light emitted by illumination module 505 towards LCOS/sensor module 510. PBS 520 passes p-polarized light and reflects s-polarized light, in the illustrated embodiment. It is appreciated that PBS 520 could be configured to pass a different polarization orientation if corresponding adjustments were made to other components in eyepiece 500. In the illustrated embodiment, beam splitter 525 is disposed within eyepiece 500 between PBS 520 and end reflector 530. In one embodiment, beam splitter 525 is a 50/50 beam splitter that passes 50% of light and reflects 50% of light, although other percentages are possible. Beam splitter 525 allows eye 560 to see light from the external scene-side of eyepiece 500, while beam splitter 525 is also capable of assisting in directing CGI light to eye 560 of a user of eyepiece 500. In one embodiment, a fixed polarization rotator is disposed between beam splitter 525 and end reflector 530 and beam splitter 525 is a polarization beam splitter. The fixed polarization rotator may be a one-quarter wavelength rotator or quarter wave plate, which rotates light approximately 45 degrees. End reflector 530 is disposed at an opposite end of LCOS/sensor module 510. In the illustrated embodiment, end reflector 530 is a concave mirror.

In the illustrated embodiment, light displayed to eye 560 starts as s-polarized light emitted from illumination module 505. Since PBS 520 passes p-polarized light and reflects s-polarized light, PBS 520 directs the s-polarized emitted light to the LCOS array of LCOS sensor module 510. (If the s-polarizer 507 is not included in illumination module 505, a p-polarized portion of the emitted light would be passed to the eye-ward side of eyepiece 500). The LCOS pixels in the LCOS array selectively reflect the s-polarized emitted light to generate CGI light to be sent along forward optical path 545. Still referring to the illustrated embodiment, the s-polarized emitted light is rotated 90 degrees to p-polarized light by the LCOS array in LCOS/sensor module 510. Hence, the CGI light sent along forward optical path 545 is p-polarized CGI light, as notated in FIG. 5.

The p-polarized CGI light encounters beam splitter 525 along forward optical path 545 and a portion (e.g. 50%) of the p-polarized CGI light is directed toward the external scene-side of eyepiece 500, while a portion (e.g. 50%) of the p-polarized CGI light is passed toward end reflector 530. It is appreciated that not all of the light paths (e.g. CGI light directed by beam splitter 525 toward the external scene-side of eyepiece 500) are shown in FIG. 5, as to not obscure the invention. The p-polarized CGI light passed by beam splitter 525 reflects off end reflector 530 and encounters beam splitter 525 which directs a portion of the p-polarized CGI light toward eye 560, while the other portion is passed by beam splitter 525.

Light imaged by a photodetector array of LCOS/sensor module 510 may start as near-infrared p-polarized light emitted by IR LED 550, in the illustrated embodiment. The near-infrared p-polarized light emitted by IR LED 550 reflects off of eye 560 toward beam splitter 525. The eye-reflected p-polarized light encounters beam splitter 525 and a portion (e.g. 50%) of the p-polarized light is passed to the external scene-side of eyepiece 500, while a portion (e.g. 50%) of the p-polarized light is directed toward end reflector 530. The eye reflected p-polarized light directed toward end reflector 530 reflects off end reflector 530 and a portion is directed toward the eye-ward side of eyepiece 500 by beam splitter 525, while the other portion is passed by beam splitter 525, and continues along reverse optical path 565. The eye reflected p-polarized light then encounters PBS 520, which passes the eye reflected p-polarized light to the photodetector array of LCOS/sensor module 510. The eye-reflected light passed by PBS 520 may travel through an infrared filter similar to IR filter 223 before being received by the photodetector array of LCOS/sensor module 510. In one embodiment, the filter is a bandpass filter that substantially passes near-infrared light between 800 and 1000 nm and IR LED 550 emits light approximately centered at 950 nm.

Figure 6:
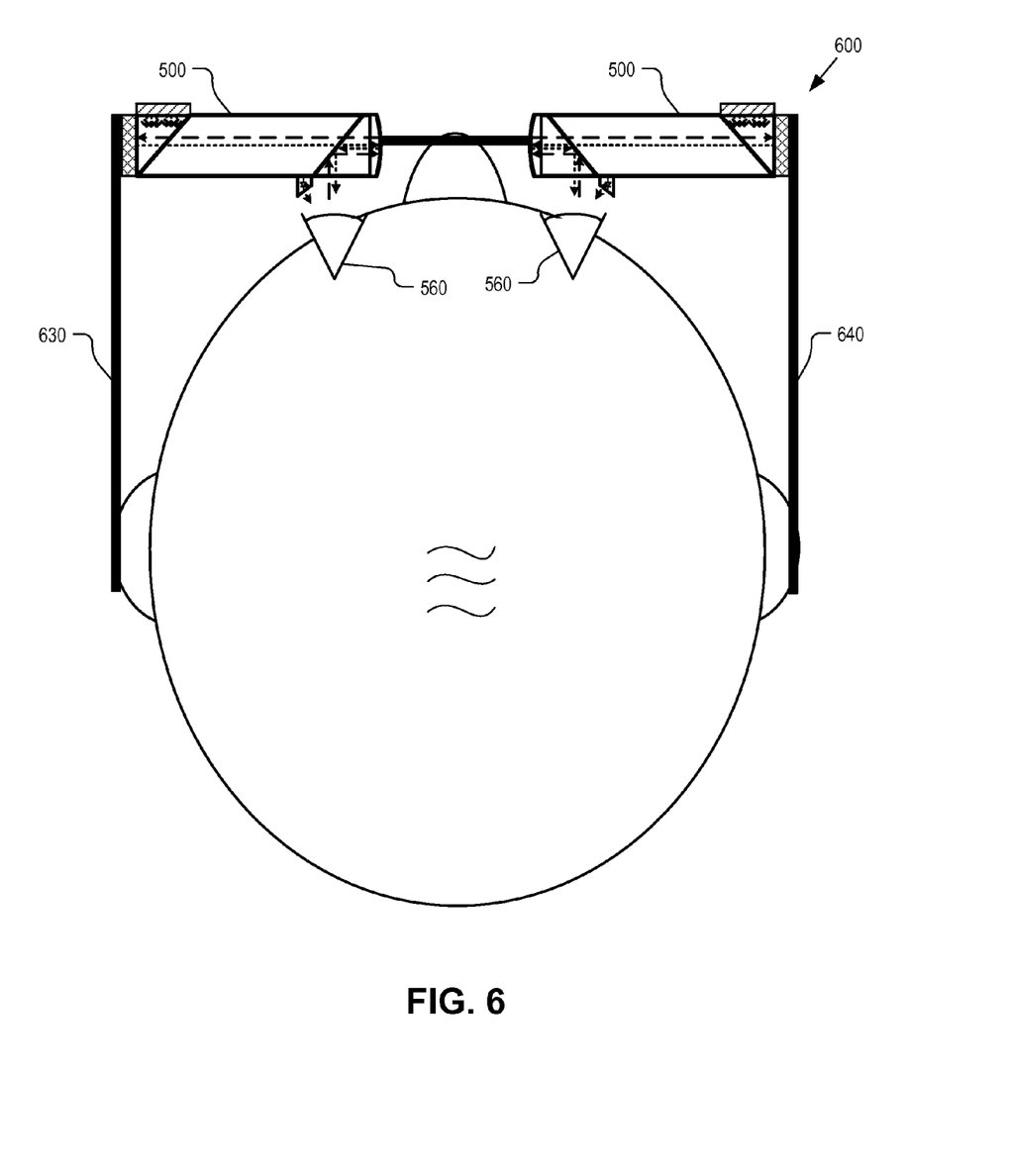
FIG. 6 is a top view of a user wearing a binocular HMD implanted with eyepieces, in accordance with an embodiment of the disclosure.

FIG. 6 is a top view of a user wearing a binocular HMD implanted with eyepieces 500, in accordance with an embodiment of the disclosure. HMD 600 includes left temple arm 630 and right temple arm 640 positioned above the user's ears. Eyepieces 500 are positioned to project CGI light into eyes 560 of a user of the HMD and to image the eye of the user using LCOS/sensor module 510. Although FIG. 6 illustrates a binocular HMD having two of eyepiece 500, one for each eye 560, an HMD may also be implemented as a monocular HMD including only a single eyepiece positioned to project CGI to, and image, a single eye 560. And, HMD 600 is illustrated as being implanted with eyepieces 500, however, an HMD may be implanted with eyepieces that incorporate alternative technologies discussed in the FIGS. 2A-4B that may not be present in the illustrated embodiment of eyepiece 500.

Figure 7:
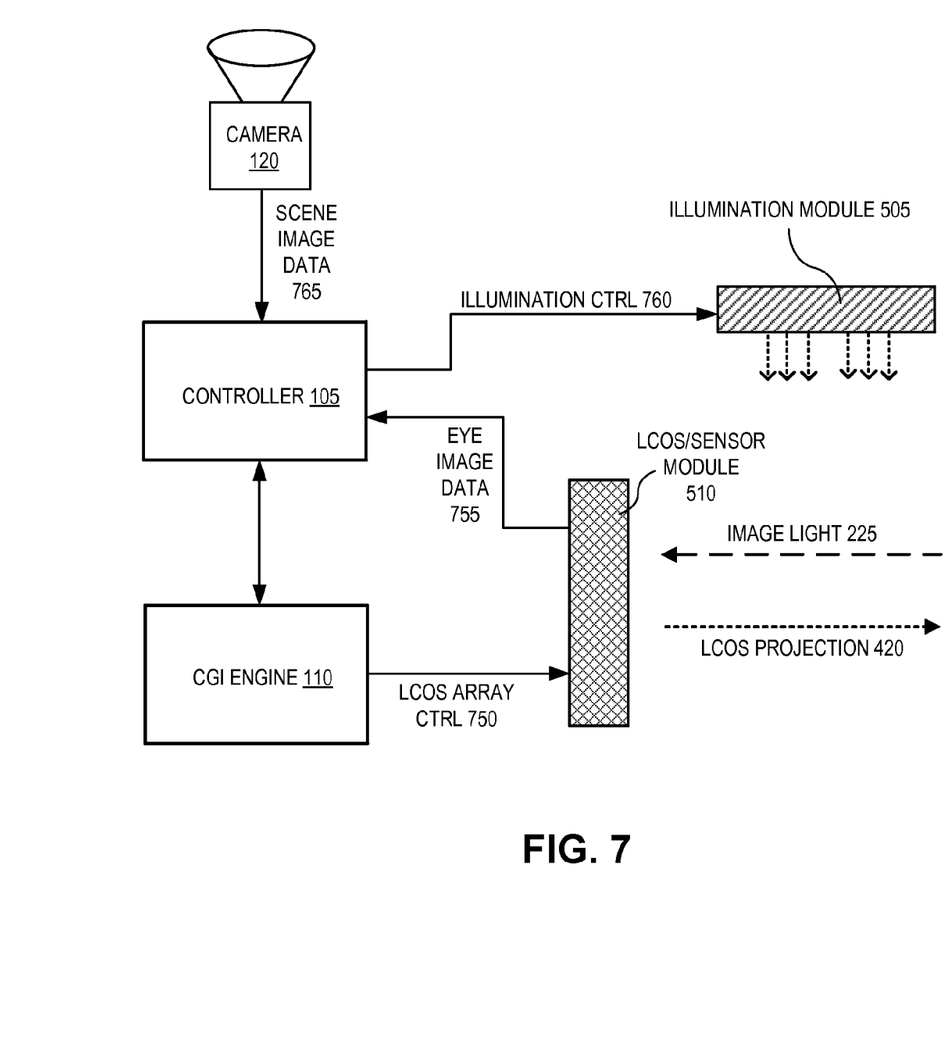
FIG. 7 is an example block diagram schematic of components that may be integrated into an HMD, in accordance with an embodiment of the disclosure.

FIG. 7 is an example block diagram schematic of components that may be integrated into an HMD, in accordance with an embodiment of the disclosure. FIG. 7 shows controller 105 configured to receive scene image data 765 from camera 120. It is appreciated that scene image data 765 may flow through intermediate electronic components (not shown) between camera 120 and controller 105. Camera 120 may be a forward facing camera of the HMD oriented to monitor a field of view seen by the user. In the illustrated embodiment, controller 105 is configured to receive eye image data 755 from the photodetector array in LCOS/sensor module 510. Eye image data 755 is based on the display array of LCOS/sensor module 510 receiving image light 225. It is appreciated that eye image data 755 may flow through intermediate electronic components (not shown) between LCOS/sensor module 510 and controller 105. Other display/sensor modules discussed in this disclosure may be used in place of LCOS/sensor module 510 to provide eye image data 755 to controller 105.

In the illustrated embodiment, controller 105 may be further configured to control the LCOS array of LCOS/sensor module 510. As shown, controller 105 may control the LCOS array through CGI engine 110. CGI engine 110 may generate images at the direction of controller 105 for displaying to the eye of a user with the LCOS array of LCOS/sensor module 510. The LCOS array of LCOS/sensor module 510 may receive LCOS array CTRL 750 from CGI engine 110 or directly from controller 105. The LCOS array of LCOS/sensor module 510 reflects light from illumination module 505 as LCOS projection 420.

Controller 105 may be further configured to control illumination module 505. In the illustrated embodiment, illumination module 505 receives illumination CTRL 760 from controller 105. Controller 105 may direct strobing of LEDs included in illumination module 505. Controller 105 may direct the on-times of RGB LEDs included in illumination module 505. In one embodiment, controller 105 coordinates the illumination of LEDs in illumination module 505 with the LCOS array in LCOS/sensor module 510.

Figure 8:
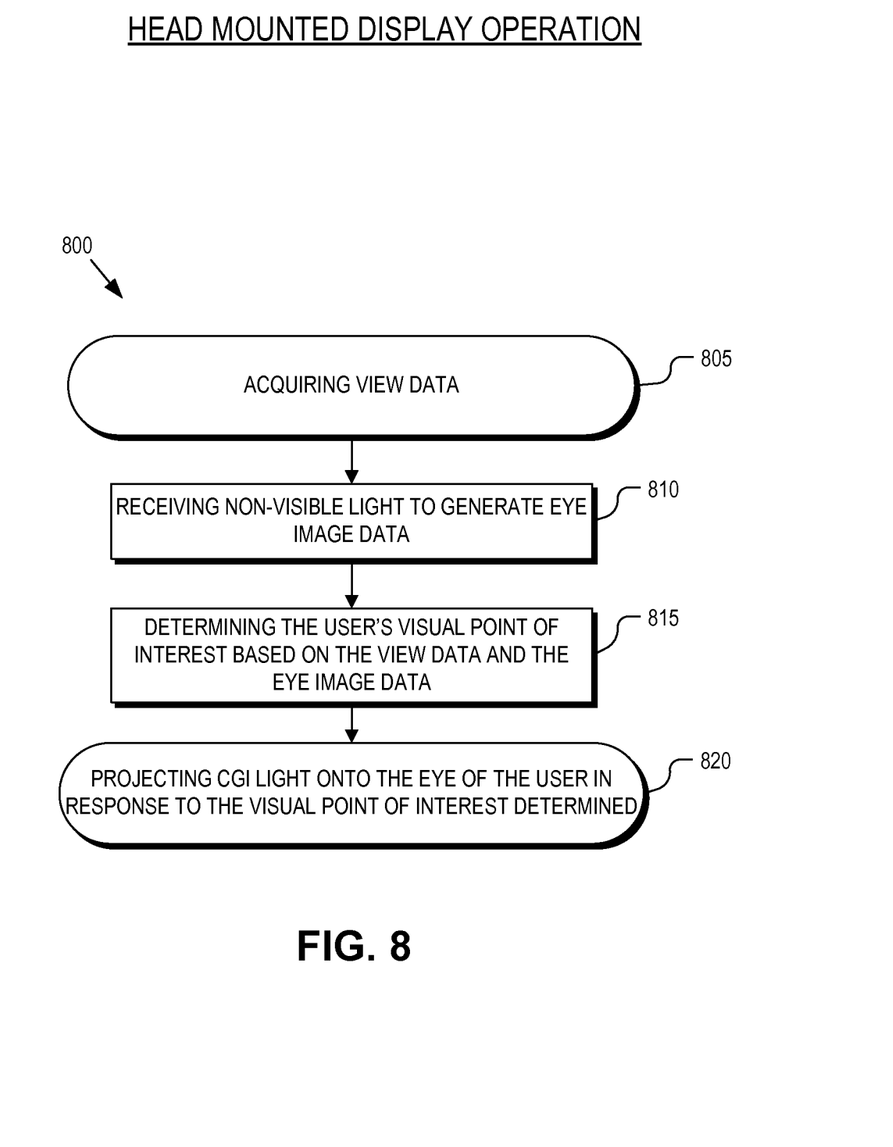
FIG. 8 is a flow chart illustrating a process of operation of an HMD for displaying CGI, in accordance with an embodiment of the disclosure.

FIG. 8 is a flow chart illustrating a process 800 of operation of an HMD for displaying CGI, in accordance with an embodiment of the disclosure. The order in which some or all of process blocks appear in process 800 should not be deemed limiting. Rather, one of ordinary skill in the art having the benefit of the present disclosure will understand that some of the process blocks may be executed in a variety of orders not illustrated, or even in parallel.

In process block 805, view data corresponding to a field of view of a user of the HMD is acquired. In process block 810, non-visible light reflected off of an eye of a user of the HMD is received to generate eye image data (e.g. eye image data 755). In process block 815, a visual point of interest of the user is determined in response to the view data and the eye image data. In process block 820, refreshed CGI light is projected onto the eye of the user in response to the visual point of interest determined. An LCOS array disposed on the same semiconductor die as the photodetector array may project the refreshed CGI onto the eye of the user of the HMD.

In one embodiment, control circuitry (e.g. controller 105) receives eye image data from the photodetector array imaging the eye of the user. The controller may determine a visual point of interest of the user in response to analyzing eye image data (e.g. eye image data 755) combined with analyzing the existing CGI projected onto the eye of the user. (Existing CGI is CGI that is presently, or has been previously, projected onto the eye of the user). For example, if the user is reading a webpage displayed to the user using CGI light, the eye image data combined with data from the existing CGI may allow a controller (e.g. controller 105) to determine where the gaze of the user is directed on the webpage. The controller may determine a displayed hyperlink on the webpage is a visual point of interest of the user. Controller 105 may then direct CGI engine 110 to generate refreshed CGI to be displayed by the LCOS array. The refreshed CGI may be the exact same CGI that was previously projected, or the refreshed CGI may be different. For example, the refreshed CGI may include information corresponding to the displayed hyperlink or a webpage corresponding to the hyperlink, if the hyperlink is determined as the visual point of interest. In a similar way, the controller may be able to determine when the user is at the bottom of a webpage or document and automatically scroll the page for the user to display new material to the user.

In one embodiment, the controller may determine a visual point of interest (e.g. a restaurant sign) of the user in response to analyzing scene image data (e.g. scene image data 765) from a camera combined with the eye image data from a photodetector array. Controller 105 may then direct CGI engine 110 to generate refreshed CGI to be displayed by the LCOS array. The refreshed CGI may be the same CGI as previously projected. Or, the refreshed CGI may be different by including information (e.g. restaurant menu) about the visual point of interest.

If the LCOS array includes the configuration discussed above in connection with FIGS. 4A-4B, a correction may be applied to eye image data (e.g. eye image data 755) to assist in determining the user's visual point of interest. The correction may be based on a transmission characteristic of the liquid crystal of the LCOS pixels. The correction may be applied in hardware and/or firmware/software running on controller 105.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus for simultaneously imaging a subject and displaying computer generated image ("CGI") light to the subject, the apparatus comprising:
    a Liquid Crystal on Silicon ("LCOS") display disposed on a semiconductor die, wherein the LCOS display includes LCOS pixels configured to selectively generate the CGI light to be sent along a forward optical path;
    a photodetector array disposed on the semiconductor die and positioned to receive non-visible image light directed along a reverse optical path, wherein the non-visible image light is reflected by the subject and travels along the reverse optical path in a substantially opposite direction as the CGI light to be sent along the forward optical path; and
    a filter element disposed in the reverse optical path for substantially filtering out visible light and substantially passing the non-visible image light to the photodetector array, wherein the non-visible image light directed along the reverse optical path travels through at least a portion of one of the LCOS pixels before reaching one of the photodetector pixels.

2. The apparatus of claim 1, wherein photodetector pixels of the photodetector array and the LCOS pixels are arranged in a repeating pattern on the semiconductor die.

3. The apparatus of claim 2, wherein the repeating pattern includes the photodetector pixels uniformly distributed amongst the LCOS pixels.

4. The apparatus of claim 2, wherein the repeating pattern includes columns of the photodetector array interlaced with columns of the LCOS pixels.

5. The apparatus of claim 1, wherein the photodetector array substantially surrounds the LCOS display.

6. The apparatus of claim 1 further comprising a first light source positioned to provide the illumination light to the LCOS display.

7. The apparatus of claim 6, wherein the first light source includes a red-green-blue light emitting diode ("RGB LED") and modulation circuitry configured to individually strobe each color of the RGB LED.

8. The apparatus of claim 1 further comprising a second light source positioned to emit the non-visible image light onto the subject.

9. An apparatus for a head mounted display ("HMD"), the apparatus comprising:
    a first light source for providing illumination light;
    a Liquid Crystal on Silicon ("LCOS") array disposed on a semiconductor die, wherein LCOS pixels of the LCOS array are configured to selectively reflect the illumination light provided by the first light source to generate computer generated image ("CGI") light to be sent along a forward optical path within an eyepiece;
    a second light source oriented to emit non-visible light in an eyeward direction of the HMD;
    a photodetector array disposed on the semiconductor die and positioned to receive a reflection of the non-visible light emitted in the eyeward direction, the reflection directed along a reverse optical path in the eyepiece in a substantially opposite direction as the CGI light along the forward optical path;
    an end reflector disposed at an opposite end of the eyepiece from the LCOS array;
    a polarizing beam splitter positioned to direct the illumination light to the LCOS array and disposed within the eyepiece between the end reflector and the LCOS array; and
    a beam splitter for directing the reflection of the non-visible light along the reverse optical path in the eyepiece, the beam splitter disposed within the eyepiece between the polarizing beam splitter and the end reflector.

10. The apparatus of claim 9 further comprising a fixed polarization rotator disposed between the beam splitter and the end reflector, wherein the beam splitter is a polarization beam splitter.

11. The apparatus of claim 9, wherein photodetector pixels of the photodetector array and the LCOS pixels are arranged in a repeating pattern on the semiconductor die, and wherein the repeating pattern includes the photodetector pixels uniformly distributed amongst the LCOS pixels.

12. The apparatus of claim 9, wherein first lines of photodetector pixels of the photodetector array are interlaced with second lines of the LCOS pixels, in a repeating pattern on the semiconductor die.

13. The apparatus of claim 9, wherein the reflection travels through liquid crystal of the LCOS pixels before reaching photodetector pixels of the photodetector array.

14. The apparatus of claim 9, further comprising a polarizing filter disposed over the second light source for polarizing the non-visible light.

15. The apparatus of claim 9, wherein the non-visible light is substantially near-infrared light centered between 800 and 1000 nm.

16. The apparatus of claim 9, wherein the eyepiece is mounted to a frame assembly of the HMD, the frame assembly including a forward facing camera oriented to monitor a field of view seen by an eye of a user of the HMD.

17. The apparatus of claim 16, further comprising control circuitry configured to receive eye image data generated from the photodetector array and scene image data generated from the forward facing camera, wherein the control circuitry is further configured to control the LCOS array.

18. A method of operating a head mounted display ("HMD"), the method comprising:
- acquiring view data corresponding to a field of view of a user of the HMD;
- receiving non-visible light reflected off of an eye of the user of the HMD to generate eye image data;
- determining a visual point of interest of the user based on the view data and the eye image data; and
- projecting refreshed computer generated image ("CGI") light from a Liquid Crystal on Silicon ("LCOS") array onto the eye of the user based on the visual point of interest, wherein a photodetector array receives the non-visible light and the photodetector array and the LCOS array are both disposed on a same semiconductor die, and wherein the non-visible light reflected off of the eye of the user travels through liquid crystal of the LCOS array before being received by the photodetector array.

19. The method of claim 18, wherein the view data includes existing CGI projected onto the eye of the user from the LCOS array, wherein the existing CGI is presently, or has been previously, projected onto the eye of the user.

20. The method of claim 19 further comprising:
- controlling a CGI engine to create a new CGI in response to determining the visual point of interest of the user, wherein the new CGI is for projecting as the refreshed CGI light.

21. The method of claim 18, wherein the view data includes scene images from a camera of the HMD oriented to monitor a forward view seen by the user.

22. The method of claim 21 further comprising:
- controlling a CGI engine to create a new CGI in response to determining the visual point of interest of the user, wherein the new CGI is for projecting as the refreshed CGI light and the new CGI includes information about the visual point of interest.

23. The method of claim 18 further comprising:
- correcting the eye image data based on a transmission characteristic of the liquid crystal.

24. The method of claim 18 further comprising:
- emitting the non-visible light onto the eye of the user with a near-infrared light source emitting near-infrared light centered between 800 and 1000 nm.

* * * * *